United States Patent
Daugherty, III

(10) Patent No.: US 10,128,788 B2
(45) Date of Patent: Nov. 13, 2018

(54) INCREASING COMPONENT LIFE IN A VARIABLE SPEED DRIVE WITH STATOR HEATING

(71) Applicant: Trane International Inc., Davidson, NC (US)

(72) Inventor: William David Daugherty, III, Gladewater, TX (US)

(73) Assignee: Trane International Inc., Davidson, NC (US)

( * ) Notice: Subject to any disclaimer, the term of this patent is extended or adjusted under 35 U.S.C. 154(b) by 0 days.

(21) Appl. No.: 15/418,930

(22) Filed: Jan. 30, 2017

(65) Prior Publication Data

US 2017/0222595 A1   Aug. 3, 2017

Related U.S. Application Data

(60) Provisional application No. 62/288,123, filed on Jan. 28, 2016.

(51) Int. Cl.
| | |
|---|---|
| *G05B 5/00* | (2006.01) |
| *G05D 23/00* | (2006.01) |
| *H02H 7/08* | (2006.01) |
| *H02P 1/04* | (2006.01) |
| *H02P 29/64* | (2016.01) |
| *H02P 6/14* | (2016.01) |

(52) U.S. Cl.
CPC .............. *H02P 29/64* (2016.02); *H02P 6/14* (2013.01)

(58) Field of Classification Search
CPC .............. H02P 29/64; H02P 6/14; H02K 9/22
USPC ........................................................ 318/473
See application file for complete search history.

(56) References Cited

U.S. PATENT DOCUMENTS

| | | | |
|---|---|---|---|
| 4,135,122 | A | 1/1979 | Holmquist et al. |
| 4,638,643 | A | 1/1987 | Sakazume et al. |
| 5,230,222 | A | 7/1993 | Erbs |
| 5,708,336 | A | 1/1998 | Eyerly et al. |
| 5,896,021 | A | 4/1999 | Kumar |
| 6,617,819 | B2 | 9/2003 | Dohmae et al. |
| 7,825,621 | B2 | 11/2010 | Wei et al. |
| 7,859,207 | B2 | 12/2010 | Yamada et al. |
| 8,011,198 | B2 | 9/2011 | Ishikawa et al. |
| 8,558,491 | B2 | 10/2013 | Kuwabara et al. |
| 8,616,855 | B2 | 12/2013 | Burchill et al. |
| 8,674,651 | B2 | 3/2014 | Ioannidis |
| 8,734,125 | B2 | 5/2014 | McSweeney et al. |
| 8,806,876 | B2 | 8/2014 | Shimoda et al. |
| 9,048,771 | B2 | 6/2015 | Ohba et al. |
| 2007/0152624 | A1 | 7/2007 | Hamaoka et al. |
| 2011/0083450 | A1 | 4/2011 | Turner et al. |
| 2012/0111043 | A1 | 5/2012 | Hatakeyama et al. |
| 2013/0152609 | A1 | 6/2013 | Hatakeyama et al. |
| 2014/0009099 | A1 | 1/2014 | Greetham |

(Continued)

FOREIGN PATENT DOCUMENTS

JP   11-159467   6/1999

*Primary Examiner* — Erick Glass
(74) *Attorney, Agent, or Firm* — The Salerno Law Firm, P.C.

(57) ABSTRACT

An apparatus and method for extending component life in a motor drive having a stator heating mode is disclosed. The current supplied to stator windings is cycled through a set of primary stator power transistors to increase the overall lifespan of the drive, thus preventing premature failure of the stator power transistors by splitting the workload between them, rather than having a single transistor supply the bulk of the stator heating current.

15 Claims, 6 Drawing Sheets

(56) References Cited

U.S. PATENT DOCUMENTS

2014/0015461 A1 1/2014 Ohba et al.
2014/0091084 A1 4/2014 Matsumoto et al.
2015/0075205 A1 3/2015 Ramayya

INCREASING COMPONENT LIFE IN A VARIABLE SPEED DRIVE WITH STATOR HEATING

BACKGROUND

1. Technical Field

The present disclosure relates to the use of power transistors driving an electric current to preheat a motor stator before using the motor, and in particular, to apparatus and methods for increasing the lifetime of such power transistors when they are used during stator heating.

2. Background of Related Art

There are many reasons why an electric motor may require preheating before it is started. For example, if a motor is at relatively low temperatures, the viscosity of the grease in the motor's bearings may not provide suitable lubrication, leading to bearing wear. Additionally, sub-zero temperatures may lead to icing between the motor's rotor and stator, inhibiting the motor's ability to start, or leading to damage.

In addition, it may be advantageous to preheat motors driving compressors in air conditioning or heat pump systems, because refrigerant tends to migrate towards the coldest location. Typically the compressor motor is outdoors and exposed to cold air during winter, whereas equipment indoors is kept at a reasonably warm temperature, so refrigerant will migrate and condense into a liquid form inside the shell of an outdoor compressor and the coil of the outdoor unit. If, at that moment the compressor is started, the compressor will be effectively trying to compress liquid, which can lead to increased compressor wear, damage, and/or failure. Compressor heating devices, such as belly-band heaters or a preheat mode, are typically used to warm up the interior or shell of the compressor. By keeping the compressor warm, any refrigerant in that area will be kept in a gaseous phase, and liquid refrigerant will migrate somewhere else, thus improving the total life of the compressor.

A preheat mode of an idle compressor generates heat within the windings of the idle compressor motor to a given motor temperature range, and can be controlled by sensing the motor temperature with a suitable sensor, such as a thermistor. A preheating mode of the idle compressor is cycled on for a given time period (e.g., 15 minutes), and can then be cycled off for a given delay period (e.g., 30 minutes) before the preheating time period is reactivated, thereby providing an optional failsafe time functionality.

Modern variable speed drive systems have been employed to run synchronous permanent magnet rotor motors used in compressors. A typical schematic diagram for a prior art three phase drive system is illustrated in FIG. 1. One technique for preheating stator windings of a motor before running the motor includes turning on a power supply transistors, such as insulated gate bipolar transistor (IGBT), in the drive to supply current to a stator winding of the motor. A standard procedure is to select one output transistor and two return transistors for stator heating current, and to continually use only these transistors for stator heating, during the entire lifetime of the system. For example (with reference to FIG. 1), by turning on three transistors in the drive (having gate terminals identified as T1, T5 and T6), nearly 30 Amperes would be applied to the stator winding of a compressor motor in a 5-ton system, due to low impedance of the stator windings. The entire 30 Ampere current would run through one IGBT (T1), pass through the U-phase winding, and then return 15 Amperes via the V- and W-phases and the associated IGBTs (T5 & T6) respectively to the power source, as illustrated in FIG. 1. Over the lifespan of the drive, the large 30 Ampere current passing through the IGBT associated with the U-phase transistor can significantly degrade this single IGBT device.

A motor drive system which improves the overall lifespan and reliability of drive components such as IGBTs would be a welcome advance in the art.

SUMMARY

The present disclosure is directed to an electric drive system for heating motor stator winding that, in an embodiment, includes a direct current power source, two or more power supply transistors, two or more power return transistors, and a control unit that switches a first one of the two or more power supply transistors on and at least one of the two or more power return transistors on during a heating demand event to supply direct current from the direct current power source to the motor stator windings. The control unit selects a second one of the two or more power supply transistors to switch on during a subsequent heating demand event.

In an embodiment, the control unit includes a memory that stores an identifier for the second one of the two or more power supply transistors and selects the second one of the two or more power supply transistors in a round-robin fashion.

In an embodiment, the control unit includes a timer and a memory that stores an amount of time that each power supply transistor in the two or more power supply transistors has been turned on during a heating demand event.

In an embodiment, the control unit compares the amount of time that each power supply transistor has been turned on and selects a power supply transistor from the two or more power supply transistors based on a lowest amount of time that each power supply transistor has been turned on.

In an embodiment, the control unit includes a current transducer, a timer, and a memory that stores an amount of ampere-hours that each power supply transistor in the two or more power supply transistors has been turned on during a heating demand event.

In an embodiment, the control unit compares the amount of ampere-hours that each power supply transistor has been turned on and selects a power supply transistor from the two or more power supply transistors based on a lowest amount of ampere-hours that each power supply transistor has supplied.

In another embodiment, the present disclosure is directed to a method for heating motor stator windings in an electric drive system having two or more power supply transistors and two or more power return transistors. The method includes switching a first one of the two or more power supply transistors on and at least one of the two or more power return transistors on during a heating demand event to supply direct current from a direct current power source to the motor stator windings, and selecting a second one of the two or more power supply transistors to switch on during a subsequent heating demand event.

In an embodiment, the selection is performed in a round-robin fashion.

In an embodiment, the method further includes storing an amount of time that each power supply transistor in the two or more power supply transistors has been turned on during a heating demand event.

In an embodiment, the method further includes comparing the amount of time that each power supply transistor has been turned on and selecting a power supply transistor from the two or more power supply transistors based on having a lowest time that each power supply transistor has been turned on.

In an embodiment, the method further includes measuring an amount of ampere-hours that each power supply transistor in the two or more power supply transistors has been turned on during a heating demand event.

In an embodiment, the method further includes comparing the amount of ampere-hours that each power supply transistor has been turned on and selecting a power supply transistor from the two or more power supply transistors based on a lowest amount of ampere-hours that each power supply transistor has supplied.

In yet another embodiment, the present disclosure is directed to a microprocessor-based control unit for an electric motor drive system having a direct current power source, two or more power supply transistors, and two or more power return transistors. The control unit includes a microprocessor, a memory, and software stored on a non-volatile media that, when loaded into the memory and run by the microprocessor, causes the control unit to switch on a first one of the two or more power supply transistors and at least one of the two or more power return transistors to supply direct current from the direct current power source during a heating demand event. The software further causes the microprocessor control unit to select a second one of the two or more power supply transistors to switch on during a subsequent heating demand event.

In an embodiment, the selection is performed in a round-robin fashion.

In an embodiment, the software further causes the control unit to store an amount of time that each power supply transistor in the two or more power supply transistors has been turned on during a heating demand event.

In an embodiment, the software further causes the control unit to compare the amount of time that each power supply transistor has been turned on and selects a power supply transistor from the two or more power supply transistors based on having a lowest time that each power supply transistor has been turned on.

In an embodiment, the software further causes the control unit to measure an amount of ampere-hours that each power supply transistor in the two or more power supply transistors has been turned on during a heating demand event.

In an embodiment, the software further causes the control unit to compare the amount of ampere-hours that each power supply transistor has been turned on and select a power supply transistor from the two or more power supply transistors based on a lowest amount of ampere-hours that each power supply transistor has supplied.

BRIEF DESCRIPTION OF THE DRAWINGS

Various embodiments of the disclosed system and method are described herein with reference to the drawings wherein.

Figure 1:
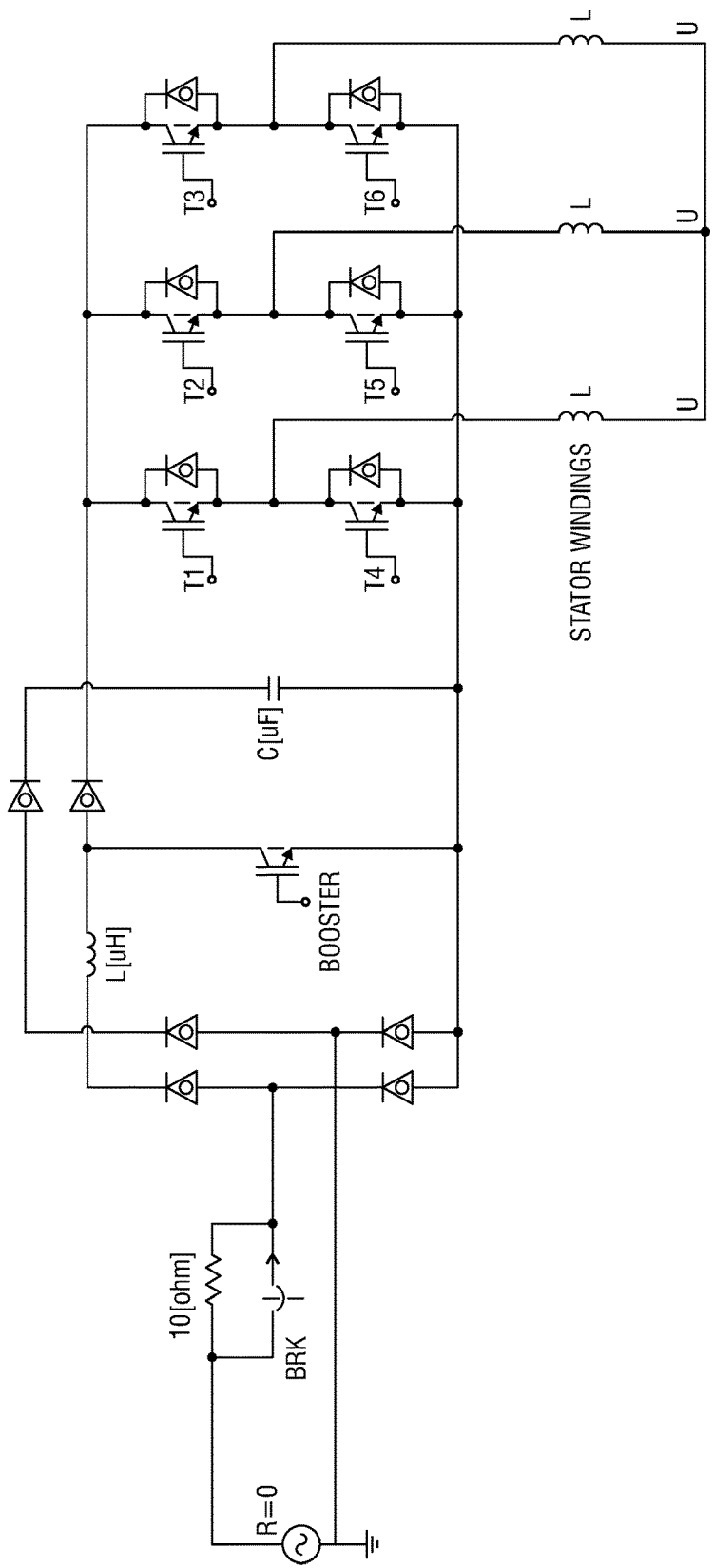
FIG. 1 is a typical schematic diagram for a prior art three phase motor stator drive system.

The various aspects of the present disclosure mentioned above are described in further detail with reference to the aforementioned figures and the following detailed description of exemplary embodiments.

DETAILED DESCRIPTION

Particular illustrative embodiments of the present disclosure are described hereinbelow with reference to the accompanying drawings; however, the disclosed embodiments are merely examples of the disclosure, which may be embodied in various forms. Well-known functions or constructions and repetitive matter are not described in detail to avoid obscuring the present disclosure in unnecessary or redundant detail. Therefore, specific structural and functional details disclosed herein are not to be interpreted as limiting, but merely as a basis for the claims and as a representative basis for teaching one skilled in the art to variously employ the present disclosure in any appropriately detailed structure. In this description, as well as in the drawings, like-referenced numbers represent elements which may perform the same, similar, or equivalent functions. The word "exemplary" is used herein to mean "serving as a non-limiting example, instance, or illustration." Any embodiment described herein as "exemplary" is not necessarily to be construed as preferred or advantageous over other embodiments. The word "example" may be used interchangeably with the term "exemplary."

Figure 2:
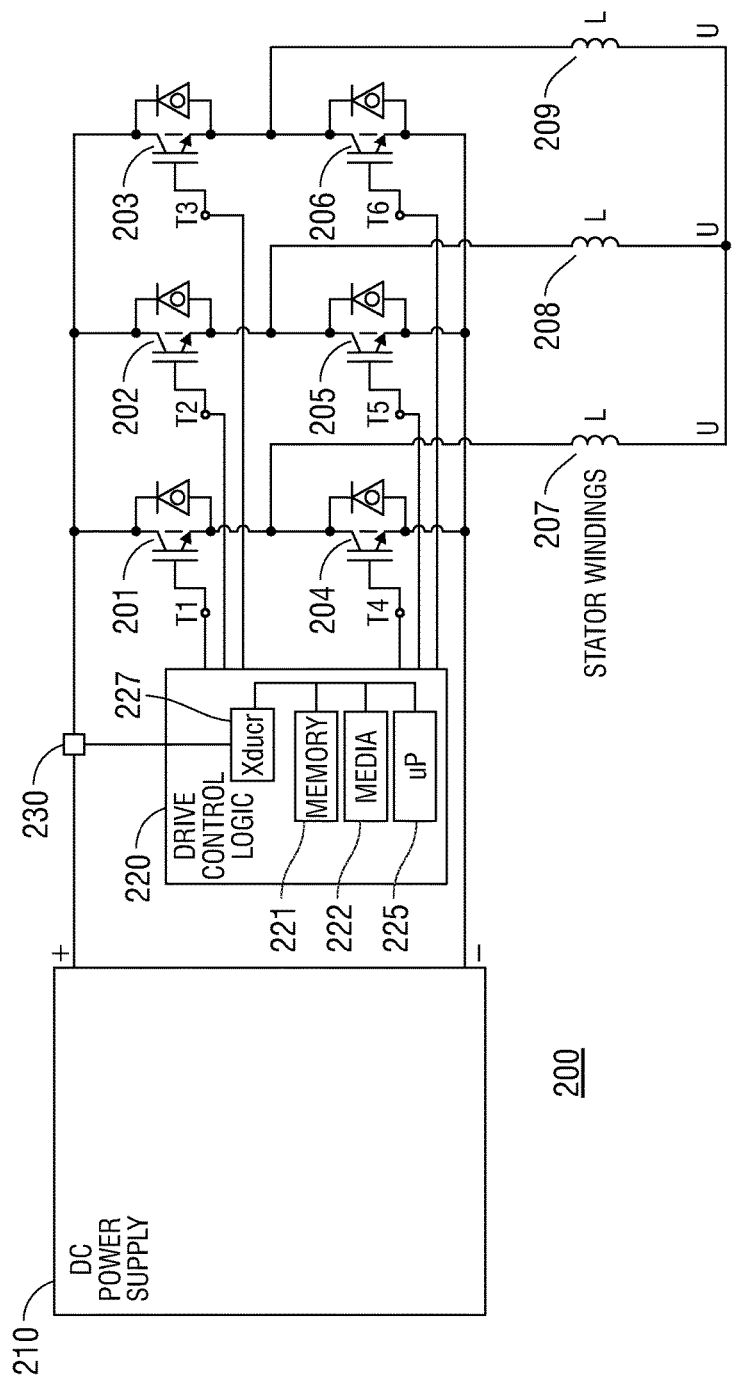
FIG. 2 is a block diagram illustrating a three phase electric motor drive control system in accordance with an embodiment of the present disclosure.

FIG. 2 is a block diagram illustrating a three phase electric motor drive control system in accordance with an embodiment of the present disclosure. As shown in FIG. 2, electric motor drive control system 200 comprises power supply transistors 201, 202, 203, power return transistors 204, 205, 206, a direct current power supply 210, drive control logic 220, and current sensor 230. Power supply transistors 201-203 and power return transistors 204-206 are preferably insulated gate bipolar transistor (IGBT) that supply current to the stator windings of the motor to heat the motor windings and run the motor.

Direct current power supply 210 provides a source of direct current power that is switched by power supply and return transistors 201-206 to supply electric power to motor stator windings U, V & W. Direct current power supply may comprise an alternating current source that has been rectified and filtered to reduce ripple.

Drive control logic 220 sequences the switching of power supply transistors 201-203 and power return transistors 204-206 during motor stator heating and motor operation. Drive control logic 220 preferably comprises a memory 221, computer-readable media 222, a microprocessor 225, and a current transducer 227. During motor operation, drive control logic 220 provides switching of the power supply and return transistors 201-206 to provide a variable speed drive system for running a motor.

Memory 221 preferably comprises dynamic random access memory. Media 222 comprises any computer-readable medium that can record data therein. "Media" includes, for instance, a disk shaped media such as CD-ROM (compact disc-read only memory), magneto optical disc or MO, digital video disc-read only memory or DVD-ROM, digital video disc-random access memory or DVD-RAM, a floppy disc, a memory chip such as random access memory or RAM, read only memory or ROM, erasable programmable read only memory or E-PROM, electrical erasable programmable read only memory or EE-PROM, a rewriteable card-type read only memory such as a smart card, a magnetic tape, a hard disc, and any other suitable means for storing a program therein.

A recording media storing a program for accomplishing the herein mentioned apparatus maybe accomplished by programming functions of the above mentioned apparatuses with a software programming language code of executable instructions run by microprocessor 225, and recording the program on media 222 such as mentioned above.

A server equipped with a hard disk drive may be employed as a recording media. Embodiments are also envisioned whereby the above mentioned computer program software is stored on such a hard disk in a server and reading the computer program software by other computers through a network.

Microprocessor 225 executes software instructions that are loaded into memory 221 from media 222, and performs operations based on said software instructions. In addition, microprocessor 225 inherently comprises a clock that can be used as a timer.

Current transducer 227 receives a current signal from current sensor 230 and converts said signal into a digital value representative of the power current flow to stator windings for use by microprocessor 225.

Figure 3:
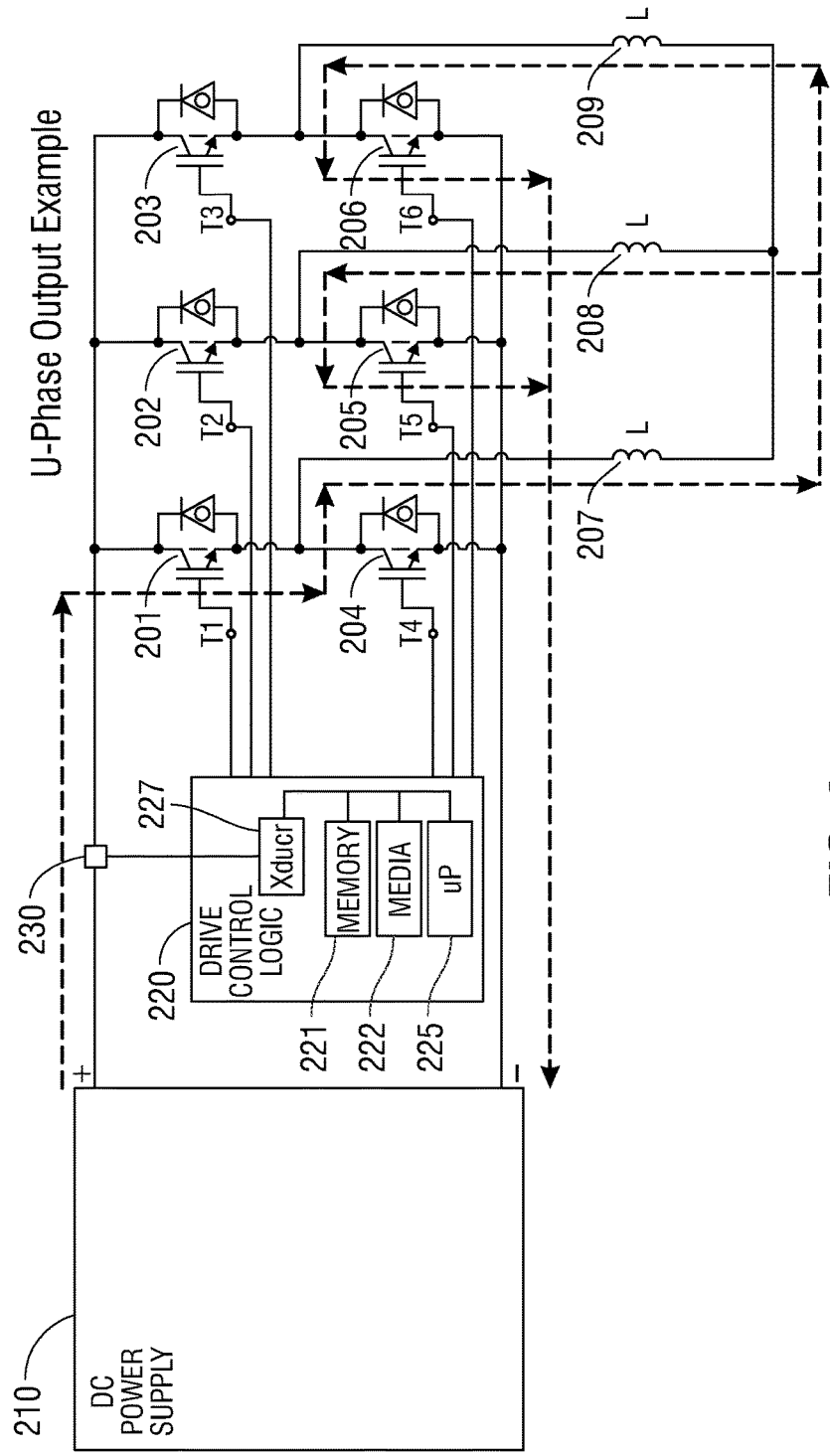
FIG. 3 illustrates U-phase stator current flow for a three phase motor in accordance with an embodiment of the present disclosure.

FIG. 3 illustrates U-phase stator current flow of an embodiment of a three phase motor control in accordance with the present disclosure. Drive control logic 220 turns on power supply transistor 201 at terminal T1, as well as power return transistors 205 and 206 at terminals T5 and T6. In doing so, direct current power is provided to U-phase stator winding, and returns through the other two stator winding phases of the motor. Such current heats the motor stator windings, but does not cause the motor to rotate.

Figure 4:
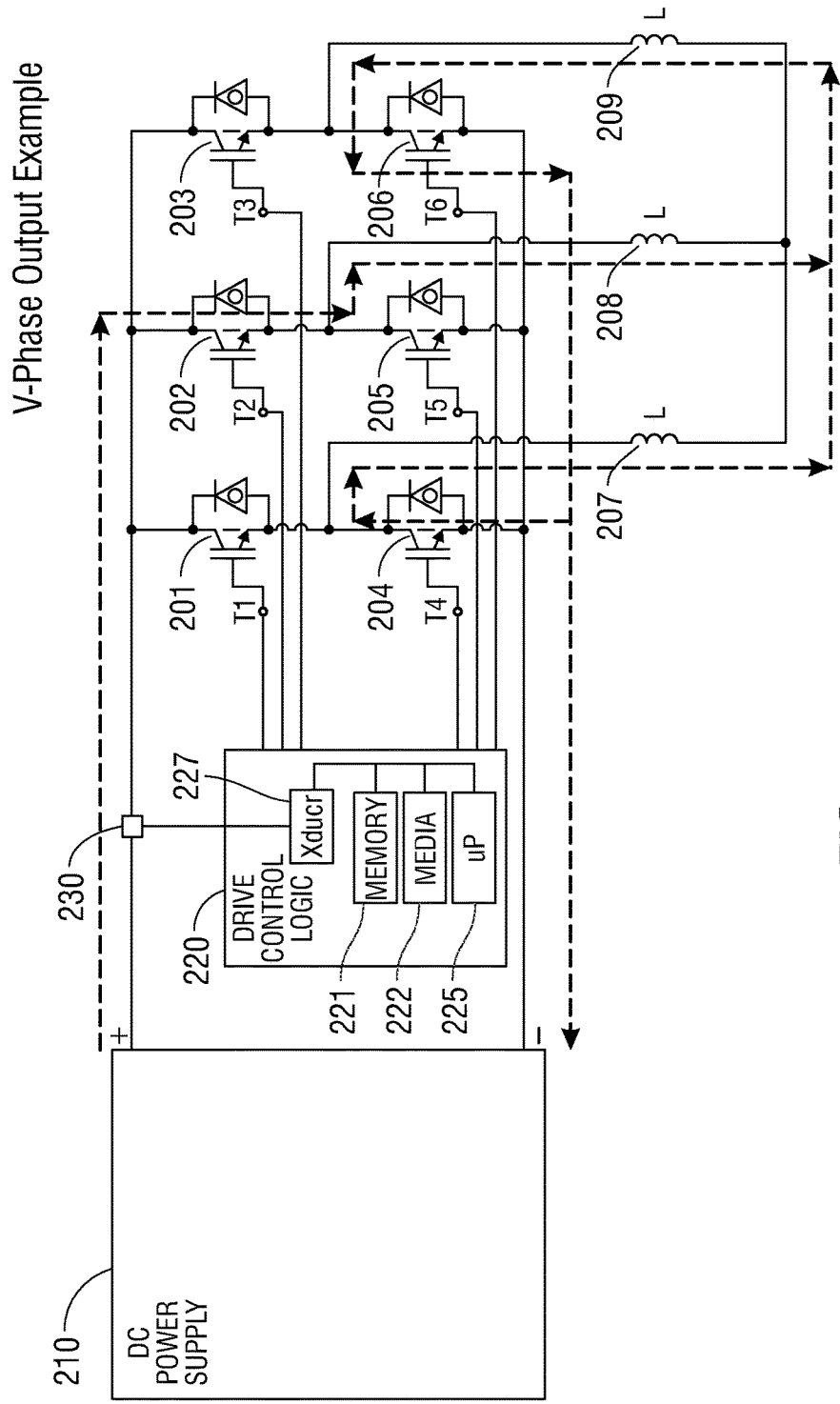
FIG. 4 illustrates V-phase stator current flow for a three phase motor in accordance with an embodiment of the present disclosure.

FIG. 4 illustrates V-phase stator current flow of an embodiment of a three phase motor control in accordance with the present disclosure. As shown in FIG. 4, drive control logic turns on power supply transistor 202 at terminal T2, as well as power return transistors 204 and 206 at terminals T4 and T6. In doing so, direct current power is provided to V-phase stator winding, and returns through the other two stator winding phases of the motor. As in the example above associated with FIG. 3, direct current power is provided to V-phase stator winding, and returns through the other two stator winding phases of the motor. Such current heats the motor stator windings, but does not cause the motor to rotate.

Figure 5:
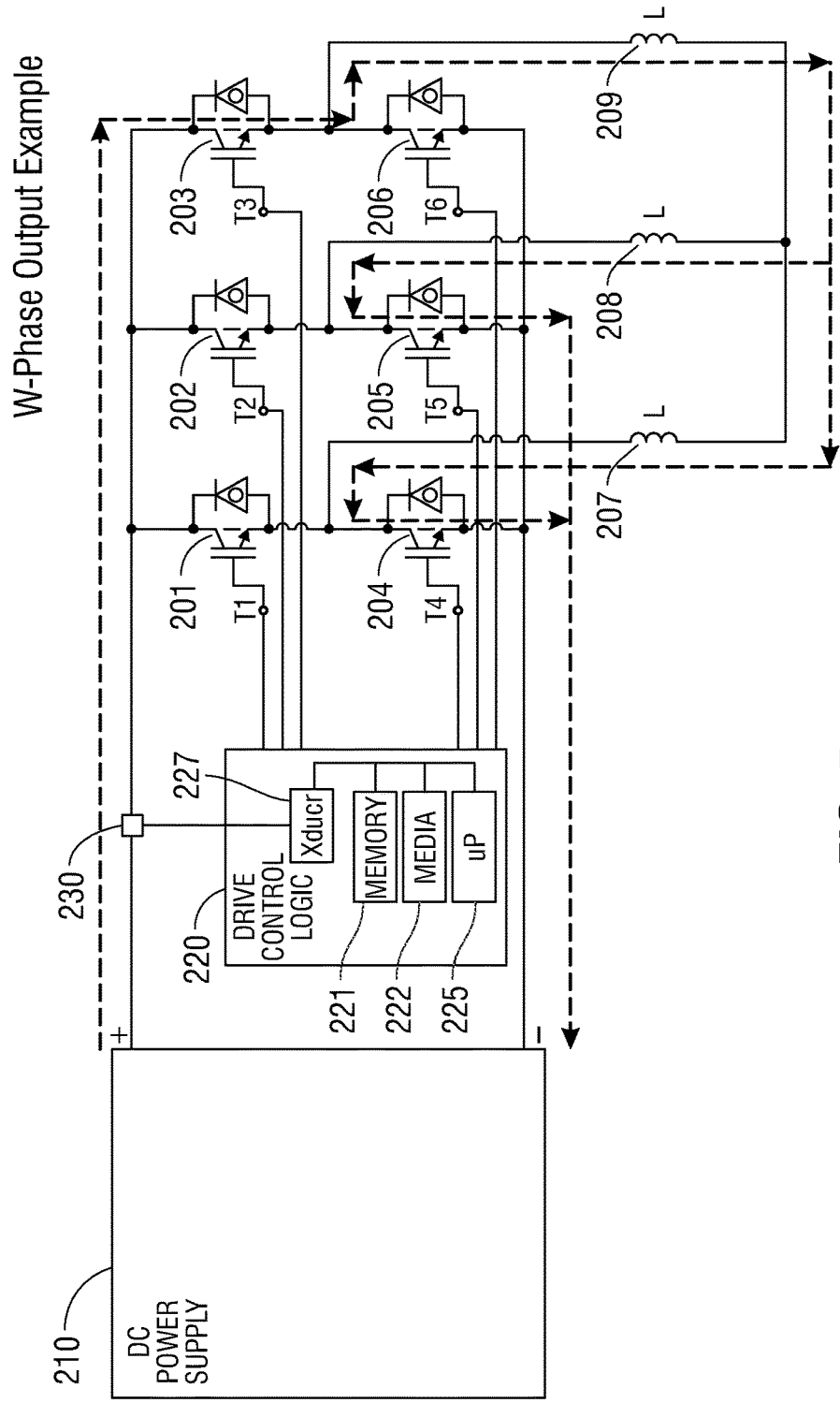
FIG. 5 illustrates W-phase stator current flow for a three phase motor in accordance with an embodiment of the present disclosure.

FIG. 5 illustrates W-phase stator current flow of an embodiment of a three phase motor control in accordance with the present disclosure. As shown in FIG. 5, drive control logic turns on power supply transistor 203 at terminal T3, as well as power return transistors 204 and 205 at terminals T4 and T5. In doing so, direct current power is provided to W-phase stator winding, and returns through the other two stator winding phases of the motor. As in the example above associated with FIGS. 3 and 4, direct current power is provided to W-phase stator winding, and returns through the other two stator winding phases of the motor. Such current heats the motor stator windings, but does not cause the motor to rotate.

Figure 6:
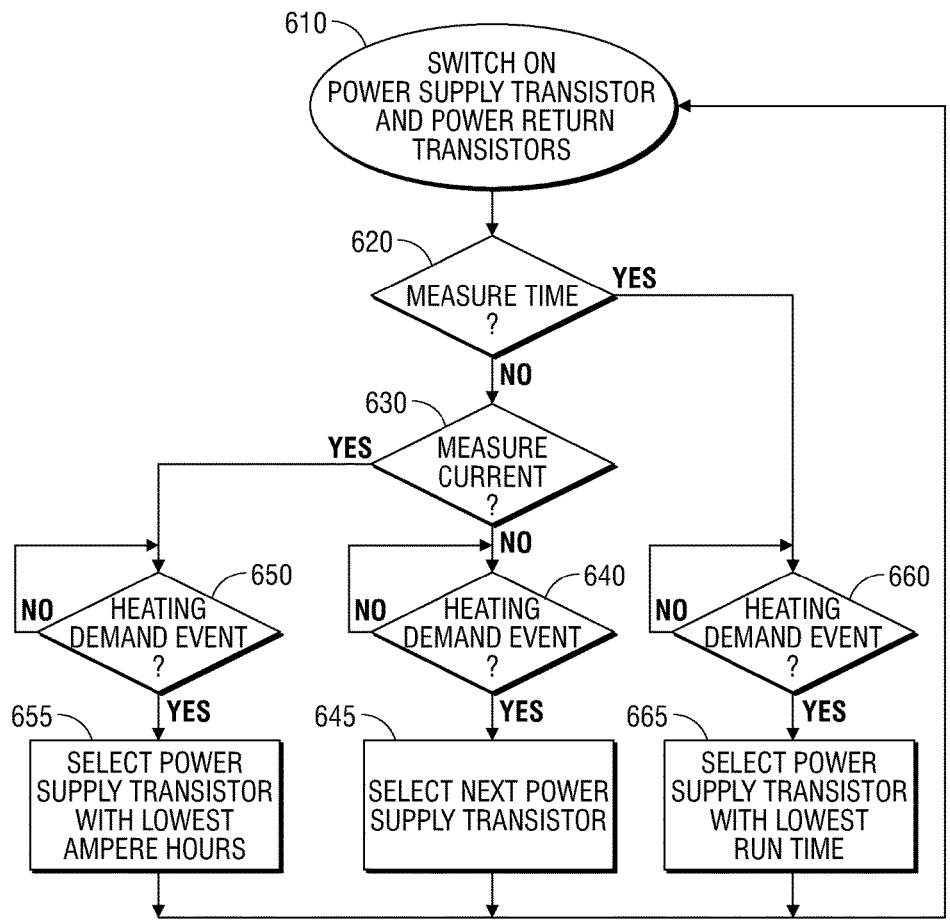
FIG. 6 is a method flow diagram illustrating methods in accordance with an embodiment of the present disclosure.

FIG. 6 is a flow diagram illustrating a method of stator heating in accordance with the present disclosure. As shown in FIG. 6, in step 610 a heating demand event occurs that requires direct current to be supplied to the motor stator windings. The motor controller switches on a power supply transistor and the power return transistors associated with the other stator winding coils.

In step 620, the motor controller performs a mode test of whether the controller will be measuring run time of the switched power supply transistor. If so, then flow control proceeds to step 660, as set forth in more detail below. If not, then flow control passes to step 630.

In step 630, the motor controller performs a mode test of whether the controller will be measuring current flow of the switched power supply transistor. If so, then flow control passes to step 650, as set forth in more detail below. If not, then flow control passes to step 640.

In step 640, at the end of the heat demand cycle, the motor controller turns off the power supply and return transistors that were turned on in step 610, and then waits for the beginning of another heating demand event. When the next heating demand event occurs, flow control passes to step 645.

In step 645, the next power supply transistor is selected in a round-robin fashion, and flow control returns to the beginning at step 610 to heat the stator windings.

In step 650, the motor controller measures current flow of the power supply transistor. At the end of the heat demand cycle, the controller turns off the power supply and return transistors that were turned on in step 610, and then waits for the beginning of another heating demand event. When the next heating demand event occurs, flow control passes to step 655.

In step 655, the power supply transistor with the lowest ampere-hours is selected, and flow control returns to the beginning at step 610 to heat the stator windings.

In step 660, the motor controller measures run time of the power supply transistor. At the end of the heat demand cycle, the controller turns off the power supply and return transistors that were turned on in step 610, and then waits for the beginning of another heating demand event. When the next heating demand event occurs, flow control passes to step 665.

In step 665, the power supply transistor with the lowest run time is selected, and flow control returns to the beginning at step 610 to heat the stator windings.

Aspects

It is noted that any of aspects 1-6, any of aspects 7-12, and/or any of aspects 13-18 may be combined with each other in any combination.

Aspect 1. An electric drive system for heating motor stator windings, comprising a direct current power source; two or more power supply transistors; two or more power return transistors; and a control unit that switches a first one of the two or more power supply transistors on and at least one of the two or more power return transistors on during a heating demand event to supply direct current from the direct current power source to the motor stator windings; wherein the control unit selects a second one of the two or more power supply transistors to switch on during a subsequent heating demand event.

Aspect 2. The electric drive system of aspect 1, wherein the control unit comprises a memory that stores an identifier for the second one of the two or more power supply transistors and selects the second one of the two or more power supply transistors in a round-robin fashion.

Aspect 3. The electric drive system of aspect 1 or 2, wherein the control unit comprises a timer and a memory that stores an amount of time that each power supply transistor in the two or more power supply transistors has been turned on during a heating demand event.

Aspect 4. The electric drive system of any of aspects 1-3, wherein the control unit compares the amount of time that each power supply transistor has been turned on and selects a power supply transistor from the two or more power supply transistors based on a lowest amount of time that each power supply transistor has been turned on.

Aspect 5. The electric drive system of any of aspects 1-4, further comprising a current transducer and wherein the control unit comprises a timer and a memory that stores an amount of ampere-hours that each power supply transistor in the two or more power supply transistors has been turned on during a heating demand event.

Aspect 6. The electric drive system of any of aspects 1-5, wherein the control unit compares the amount of ampere-hours that each power supply transistor has been turned on and selects a power supply transistor from the two or more power supply transistors based on a lowest amount of ampere-hours that each power supply transistor has supplied.

Aspect 7. A method for heating motor stator windings in an electric drive system comprising two or more power supply transistors and two or more power return transistors, the method comprising switching a first one of the two or more power supply transistors on and at least one of the two or more power return transistors on during a heating demand event to supply direct current from a direct current power source to the motor stator windings; and selecting a second one of the two or more power supply transistors to switch on during a subsequent heating demand event.

Aspect 8. The method of aspect 7, wherein the selection is performed in a round-robin fashion.

Aspect 9. The method of aspect 7 or 8 further comprising storing an amount of time that each power supply transistor in the two or more power supply transistors has been turned on during a heating demand event.

Aspect 10. The method of any of aspects 7-9 further comprising comparing the amount of time that each power supply transistor has been turned on and selecting a power supply transistor from the two or more power supply transistors based on having a lowest time that each power supply transistor has been turned on.

Aspect 11. The method of any of aspects 7-10 further comprising measuring an amount of ampere-hours that each power supply transistor in the two or more power supply transistors has been turned on during a heating demand event.

Aspect 12. The method of any of aspects 7-11, the method further comprising comparing the amount of ampere-hours that each power supply transistor has been turned on and selecting a power supply transistor from the two or more power supply transistors based on a lowest amount of ampere-hours that each power supply transistor has supplied.

Aspect 13. A microprocessor-based control unit for an electric motor drive system comprising a direct current power source, two or more power supply transistors and two or more power return transistors, the control unit comprising a microprocessor; a memory; and software stored on a non-volatile media that, when loaded into the memory and run by the microprocessor, causes the control unit to switch on a first one of the two or more power supply transistors and at least one of the two or more power return transistors to supply direct current from the direct current power source during a heating demand event; wherein the software further causes the microprocessor control unit to select a second one of the two or more power supply transistors to switch on during a subsequent heating demand event.

Aspect 14. The control unit of aspect 13, wherein the selection is performed in a round-robin fashion.

Aspect 15. The control unit of aspect 13 or 14, wherein the software further causes the control unit to store an amount of time that each power supply transistor in the two or more power supply transistors has been turned on during a heating demand event.

Aspect 16. The control unit of any of aspects 13-15, wherein the software further causes the control unit to compare the amount of time that each power supply transistor has been turned on and selects a power supply transistor from the two or more power supply transistors based on having a lowest time that each power supply transistor has been turned on.

Aspect 17. The control unit of any of aspects 13-16, wherein the software further causes the control unit to measure an amount of ampere-hours that each power supply transistor in the two or more power supply transistors has been turned on during a heating demand event.

Aspect 18. The control unit of any of aspects 13-17, wherein the software further causes the control unit to compare the amount of ampere-hours that each power supply transistor has been turned on and select a power supply transistor from the two or more power supply transistors based on a lowest amount of ampere-hours that each power supply transistor has supplied.

Particular embodiments of the present disclosure have been described herein, however, it is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in any appropriately detailed structure.

What is claimed is:

1. An electric drive system for heating motor stator windings, comprising:
   a direct current power source;
   two or more power supply transistors;
   two or more power return transistors; and
   a control unit that switches on a first one of the two or more power supply transistors and at least one of the two or more power return transistors during a heating demand event to supply direct current from the direct current power source to the motor stator windings;
   wherein the control unit compares a wear metric of each power supply transistor for the heating demand event and switches on one power supply transistor from the two or more power supply transistors having the lowest wear metric for the heating demand event.

2. The electric drive system of claim 1, wherein the control unit comprises a timer and a memory that stores an aggregate amount of time that each power supply transistor in the two or more power supply transistors has been turned on during the heating demand event.

3. The electric drive system of claim 1, wherein the wear metric includes an aggregate amount of time that each power supply transistor has been turned on during the heating demand event.

4. The electric drive system of claim 1, further comprising a current transducer and wherein the control unit comprises a timer and a memory that stores an aggregate amount of ampere-hours that each power supply transistor in the two or more power supply transistors has been turned on during the heating demand event.

5. The electric drive system of claim 1, wherein the wear metric includes an aggregate amount of ampere-hours that each power supply transistor has been turned on during the heating demand event.

6. A method for heating motor stator windings in an electric drive system comprising two or more power supply transistors and two or more power return transistors, the method comprising:
    switching on a first one of the two or more power supply transistors and at least one of the two or more power return transistors during a heating demand event to supply direct current from a direct current power source to the motor stator windings; and
    comparing a wear metric of each power supply transistor for the heating demand event and switches on one power supply transistor from the two or more power supply transistors having the lowest wear metric for the heating demand event.

7. The method of claim 6, the method further comprising storing an amount of time that each power supply transistor in the two or more power supply transistors has been turned on during the heating demand event.

8. The method of claim 7, wherein comparing a wear metric includes comparing the amount of time that each power supply transistor has been turned on during the heating demand event.

9. The method of claim 6, the method further comprising measuring an amount of ampere-hours that each power supply transistor in the two or more power supply transistors has been turned on during the heating demand event.

10. The method of claim 9, wherein comparing a wear metric includes comparing the amount of ampere-hours that each power supply transistor has been turned on during the heating demand event.

11. A microprocessor-based control unit for an electric motor drive system comprising a direct current power source, two or more power supply transistors and two or more power return transistors, the control unit comprising:
    a microprocessor;
    a memory; and
    software stored on a non-volatile media that, when loaded into the memory and run by the microprocessor, causes the control unit to switch on a first one of the two or more power supply transistors and at least one of the two or more power return transistors to supply direct current from the direct current power source during a heating demand event;
    wherein the software further causes the microprocessor control unit to compare a wear metric of each power supply transistor for the heating demand event and switch on one power supply transistor from the two or more power supply transistors having the lowest wear metric for the heating demand event.

12. The control unit of claim 11, wherein the software further causes the control unit to store an amount of time that each power supply transistor in the two or more power supply transistors has been turned on during the heating demand event.

13. The control unit of claim 11, wherein the software determines the wear metric based on the amount of time that each power supply transistor has been turned on during the heating demand event.

14. The control unit of claim 11, wherein the software further causes the control unit to measure an amount of ampere-hours that each power supply transistor in the two or more power supply transistors has been turned on during the heating demand event.

15. The control unit of claim 11, wherein the software determines the wear metric based on the amount of ampere-hours that each power supply transistor has been turned on during the heating demand event.

* * * * *